(12) United States Patent
Travis et al.

(10) Patent No.: US 9,009,945 B2
(45) Date of Patent: Apr. 21, 2015

(54) HYDRAULIC TENSIONING FLANGE CONNECTOR METHOD

(71) Applicant: Weatherford/Lamb, Inc., Houston, TX (US)

(72) Inventors: Todd Travis, Humble, TX (US); Brandon M. Cain, Houston, TX (US); Ping Cai, Sugar Land, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 0 days.

(21) Appl. No.: 14/089,286

(22) Filed: Nov. 25, 2013

(65) Prior Publication Data

US 2014/0075741 A1 Mar. 20, 2014

Related U.S. Application Data

(62) Division of application No. 13/019,795, filed on Feb. 2, 2011, now Pat. No. 8,616,590.

(60) Provisional application No. 61/301,303, filed on Feb. 4, 2010.

(51) Int. Cl.
*F16L 23/00* (2006.01)
*B23P 11/00* (2006.01)
*F16L 23/024* (2006.01)
*F16L 23/036* (2006.01)

(52) U.S. Cl.
CPC .............. *F16L 23/024* (2013.01); *F16L 23/036* (2013.01)

(58) Field of Classification Search
CPC .................................................. F16L 23/036

USPC ............ 29/525.01, 525.11; 285/405, 416, 95, 285/412
See application file for complete search history.

(56) References Cited

U.S. PATENT DOCUMENTS

| | | | |
|---|---|---|---|
| 3,325,190 A | 7/1963 | Eckert et al. |
| 4,185,856 A | 1/1980 | McCaskill |
| 4,317,586 A | 3/1982 | Campbell |
| 4,475,750 A | 10/1984 | Campbell |

(Continued)

FOREIGN PATENT DOCUMENTS

| | | |
|---|---|---|
| GB | 2384839 | 6/2003 |
| JP | 2009257362 | 11/2009 |

OTHER PUBLICATIONS

Combined Search and Examination Report for corresponding UK Appl. No. GB1101873.6, dated May 5, 2011.

(Continued)

*Primary Examiner* — Jermie Cozart
(74) *Attorney, Agent, or Firm* — Wong, Cabello, Lutsch, Rutherford & Brucculeri LLP

(57) ABSTRACT

Hydraulic flange connectors connect two flange components together, and hydraulic pressure applied to ports in connector holes of one of the flanges tension the flange studs and crush the gasket between the flange components. Each connector has a piston that disposes in the connector hole and can move therein when hydraulic pressure is applied through the port by a pump. A first stud connected to the piston extends beyond one open end of the hole for connection to a first nut, while a second stud connected to the piston extending beyond another open end of the to the second flange component for connection to a second nut. A retainer having seals threads in this other open end of the hole and seals between the hole and the second stud.

28 Claims, 4 Drawing Sheets

(56) References Cited

U.S. PATENT DOCUMENTS 4,987,956 A    1/1991   Hansen et al.
6,929,287 B2   8/2005   Flindall
7,469,931 B2 * 12/2008  Biester .......................... 285/18

OTHER PUBLICATIONS

Patent Examination Report No. 2 for corresponding Australian Appl. No. 2011200447, dated May 29, 2013.

* cited by examiner

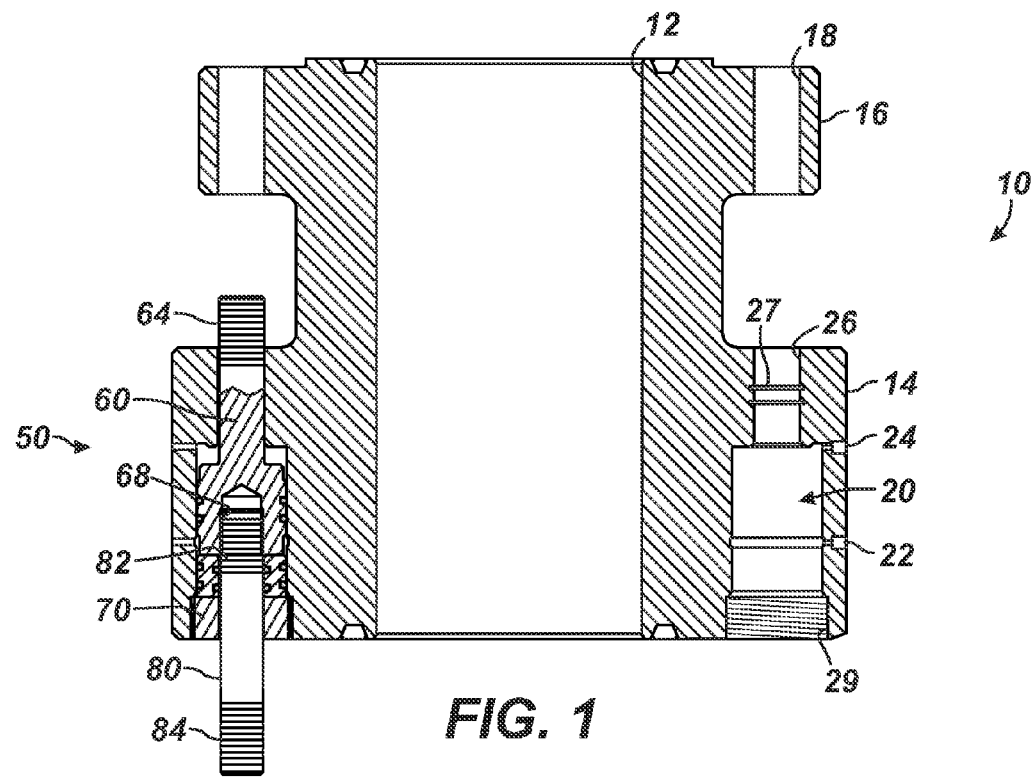
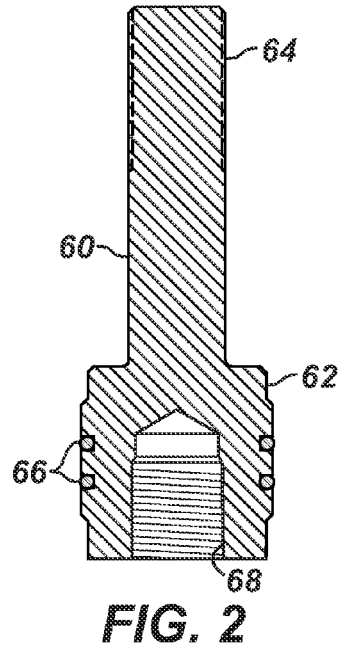
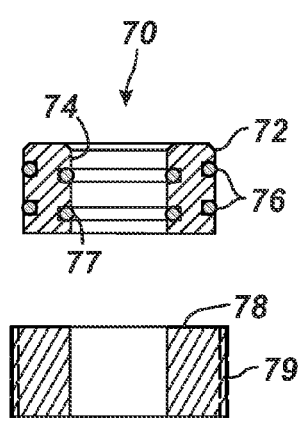
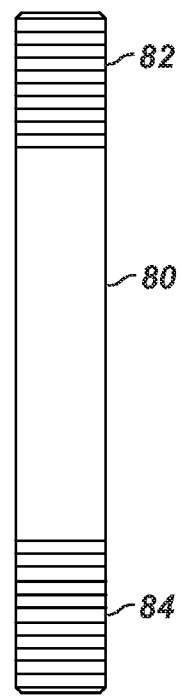
FIG. 1
FIG. 2
FIG. 3
FIG. 4

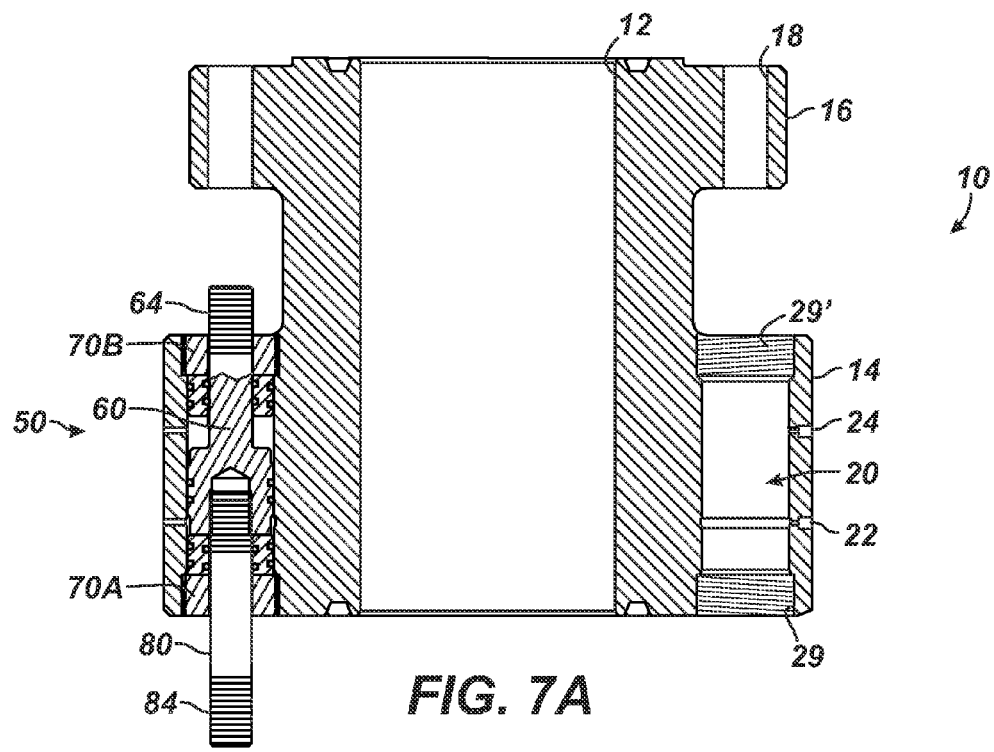
*FIG. 7A*
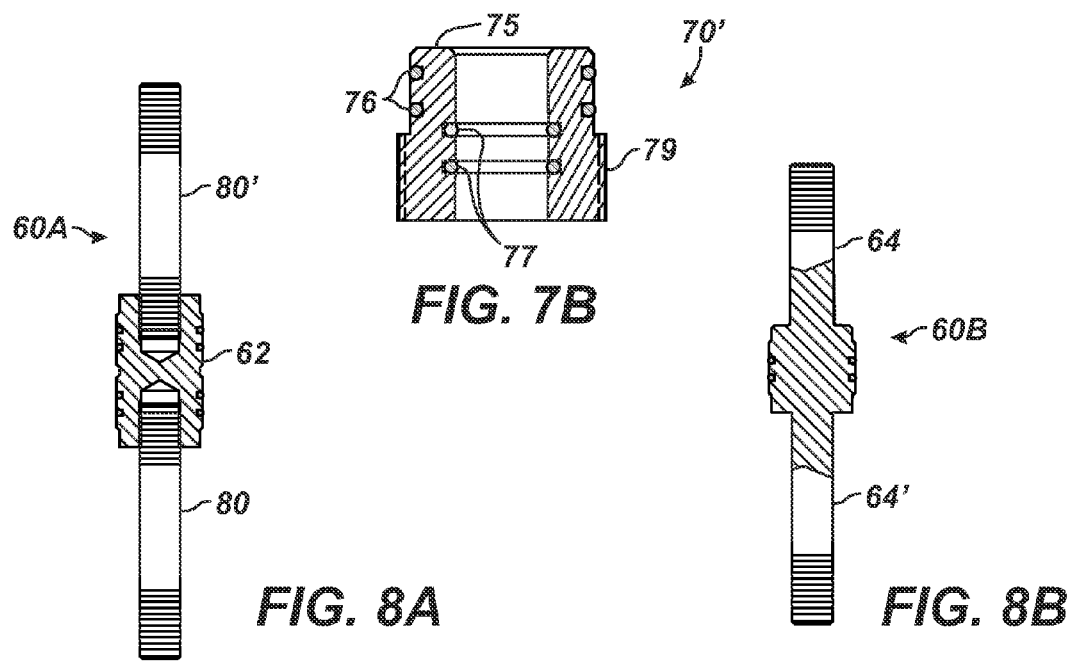
*FIG. 8A*          *FIG. 7B*          *FIG. 8B*

HYDRAULIC TENSIONING FLANGE CONNECTOR METHOD

CROSS-REFERENCE TO RELATED APPLICATIONS

This is a divisional of U.S. application Ser. No. 13/019,795, filed 2 Feb. 2011, which is a non-provisional of U.S. Provisional Appl. Ser. No. 61/301,303, filed on 4 Feb. 2010, which are both incorporated herein by reference.

BACKGROUND

Connecting flanges of components together typically uses standard flange bolting, segmented mechanical clamps, and threaded connectors. Using segmented mechanical clamps requires a special clamp hub profile to be used, while the threaded connectors also require special threaded profiles. The traditional way for making up flanged connections (without using clamp hubs or other non-API flange connectors) has been to torque up studs and nuts using either hand tools or hydraulic/pneumatic torque wrenches. Depending on the size of flanges being connected, there could be over a dozen of these connections that technicians must make up. As expected, this can result in a very time-consuming process, and the technicians must spend a significant amount of time under a rig to make the connections.

The subject matter of the present disclosure is directed to overcoming, or at least reducing the effects of, one or more of the problems set forth above.

SUMMARY

A hydraulic flange connection has a first flange component with connector holes defined therein around the component's central bore. Hydraulic flange connectors for connecting the first flange component to a second flange component dispose in the connector holes. These connectors have a piston and two studs. Both studs may thread into the piston, or the studs may be integrally formed with the piston to form one piece. In another arrangement, one stud may be integrally formed with the piston, while the other stud threads into the pistons threaded opening.

In any event, the upper stud connected to the piston has a distal end that extends beyond the whole's upper end and can connect to an upper nut. The lower stud also has a distal end extending through the stud hole of the other flange component, and a lower nut can connect to the lower stud. Once the connectors are installed and the upper and lower nuts hand-tightened. The pistons can travel in a vertical direction in the connector holes by hydraulic pressure applied through hydraulic ports in the flange component. In this way, the hydraulic flange connectors use hydraulic pistons to tension the API flange studs and crush the API gasket between a BOP flange and a casing head. While not limited to BOP-type connections, the hydraulic connections disclosed herein are particularly useful for connecting a BOP to standard API flanges. This API flange tensioning apparatus can be hydraulically activated with a hand pump, power pump, or the like. All equipment other than the connector can be standard API flanged wellhead equipment.

The foregoing summary is not intended to summarize each potential embodiment or every aspect of the present disclosure.

BRIEF DESCRIPTION OF THE DRAWINGS

FIG. 1 illustrates a cross-section of a hydraulic flange connector for a BOP flange according to certain teachings of the present disclosure.

FIG. 2 illustrates a cross-section of a stud piston of the disclosed hydraulic flange connector.

FIG. 3 illustrates a cross-section of a seal retainer of the disclosed hydraulic flange connector.

FIG. 4 illustrates a double-end stud of the disclosed hydraulic flange connector.

FIG. 7A illustrates a cross-section of another hydraulic flange connector for a BOP flange according to certain teachings of the present disclosure.

FIG. 7B illustrates a cross-section of another seal retainer of the disclosed hydraulic flange connector.

FIGS. 8A-8B illustrate additional stud pistons for the disclosed hydraulic flange connector.

DETAILED DESCRIPTION

Figure 5:
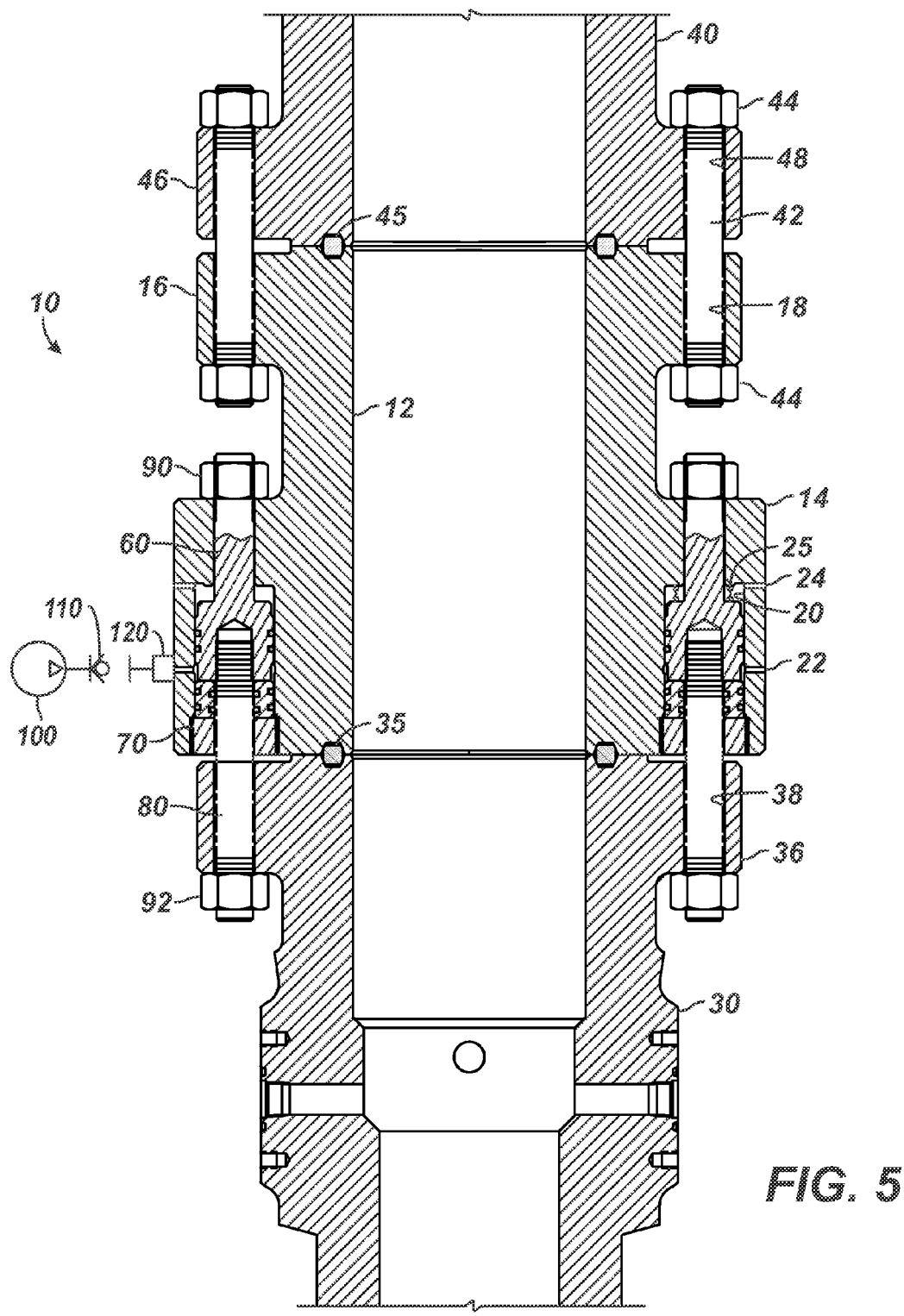
FIG. 5 illustrates a cross-section of the BOP flange coupled to a casing head with the disclosed hydraulic flange connector and coupled to another BOP component using conventional studs and nuts.

A hydraulic flange connector 50 illustrated in FIG. 1 couples a flange component 10 to another component (not shown). The flange component 10 defines piston bores or connector holes 20 in the component's flange 14 around the flange's central bore 12. Each connector hole 20 acts as a pressure chamber and defines an input port 22 and an outlet port 24. A stud passage 26 extends up through the top of the bore 20 and has internal grooves 27 for O-rings and backups.

The hydraulic flange connectors 50 (only one shown) install in these connector holes 20. Each hydraulic flange connector 50 includes a stud piston 60, a seal retainer 70, and a double-end stud 80. The stud piston 60 (shown in detail in FIG. 2) has a piston portion 62 at one end and has a stud portion 64 at the other end. The piston portion 62 defines an opening 68 with an internal thread, while the stud portion 64 has an external thread.

A pair of O-ring seals 66 and two backups (not shown) for each O-ring surround the piston portion 62. (The backups help protect the O-rings as they move in the connector holes 20.) As shown in FIG. 1, the stud piston 60 inserts into the connector hole 20 of the flange component 10 so that the stud portion 64 extends beyond the bore's stud passage 26. As shown, the stud passage 26 defines a diameter comparable to the stud portion 64, while the other open end of the connector hole 20 defines a greater diameter to form a pressure chamber for the piston portion 62 to fit therein. Although not shown, a spring return (such as a coil spring or other biasing element) may also insert in the connector hole 20 around the stud portion 64. In the absence of hydraulic pressure acting against piston portion 62, the spring return (not shown) can move the connector 50 into its stroke-down position as shown in FIG. 1.

The seal retainer 70 (shown in detail in FIG. 3) also fits into the connector hole 20 below the stud piston 60 to seal the lower end of the hole 20 and keep the stud piston 60 therein. In FIG. 3, for example, the seal retainer 70 has two elements including a seal body or washer 72 and a lock nut 78. The washer 72 has external O-ring seals 76 with backups (not shown) for engaging in the connector hole 20 and has internal O-ring seals 77 with backups (not shown) for engaging the double-end stud 80. An external thread 79 on the lock nut 78 threads into a threaded end 29 of the connector hole 20 on the flange component 10.

The double-end stud 80 (shown in detail in FIG. 4) has first and second threaded ends 82/84. One threaded end 82 threads into the threaded opening 68 in the stud piston 60. The other threaded end 84 passes through the flange of another component as described below to fasten thereto by a nut.

Installation of the flange component 10 using the hydraulic connector 50 is discussed with reference to FIG. 5. As shown, the flange component 10 couples to a first flange component 30 with the disclosed hydraulic connectors 50 and can couple to a second flange component 40 using conventional studs 42 and nuts 44. For example, the flange component 10 can be a Blowout Preventer (BOP) flange for a wellhead. The first flange component 30 can be a casing head, and the second flange component 40 can be a tubing spool, a gate valve, or other suitable wellhead component for a BOP.

Before installing the flange component 10 on the casing head 30, however, operators slide O-ring seals 66/76/77 and backups (not shown) onto the stud pistons 60 and onto the seal retainers 70, and operators insert O-ring seals inside the grooves 27 of the flange's connector holes 20. Operators then insert the stud pistons 60 into the connector holes 20 of the flange component 10. Due to the O-ring seals, the stud pistons 60 may encounter some resistance so the pistons 60 may need to be gently pushed in position. Additionally, some greasing of the parts may be needed for assembly.

The double-end studs 80 then thread into the bottom ends 68 of the piston studs 60 until a positive stop is achieved. At this point, operators pass the seal retainers 70 onto the studs 80 and thread the retainers 70 into the connector holes 20. (This may involve a two-step or single step process depending on the type of retainer 70 used.) The bottom of the retainers 70 (i.e., the washer 78) can have key slots (not shown) to allow operators to turn and thread the retainers 70 in the bores 20. In any event, the bottoms of the seal retainers 70 are preferably flush with the flange's bottom surface.

With all of the hydraulic connectors 50 fit into the connector holes 20, operators then connect an autoclave-style fitting 120 in the pressure input port 22 and connect a ball check valve 110 to the inlet port 22's fitting. A fitting or other component (not shown) may also be attached to the output port 24.

Operators make sure all of the stud pistons 60 are in stroke-down positions (as shown in FIG. 5). As noted previously, spring returns 25 may insert in the connector holes 20 around the stud portion 64 to push the stud pistons 60 in their stroke-down positions. Then, operators install a ring gasket 35 in the gasket groove on the casing head 30 and install the flange component 10 onto the casing head 30. The double-end studs 80 pass through stud holes 38 in the head's flange 36. Upper nuts 90 thread onto the threaded ends of the piston's stud portions 62, and lower nuts 92 thread onto the exposed ends of the studs 80 beyond the head's flange 36. Operators tighten all these nuts 90/92 hand-tight.

At this stage, hydraulic pressure is applied to the hydraulic connectors 50 to tension the studs 80. To do this, operators connect a hydraulic hand pump, power pump, or other type of pump 100 to the pressure input port 22's check valve 110 and slowly pump hydraulic fluid into the bore 20 to a designated pressure. The hydraulic pressure acts against the bottom of the piston portion 62 of the stud piston 60 and forces the stud piston 60 upward. While the hydraulic pressure forces the stud pistons 60 upward in the connector holes 20, operators hand tighten all of the upper nuts 90 clockwise onto the stud portions 62. This movement of the stud pistons 60 and tightening of the upper nuts 90 tends to tension at least the double-end stud 80 in a way similar to a hydraulic bolt tensioner.

In general, the output port 24 can act as a leak indicator should any of the seals 66 fail. If hydraulic fluid comes out of this port 24 when pumping, operators can plug this port 24 as well as the other port 22 and leave the connector 50 as is.

The designated pressure depends on the amount of pre-tension to be applied to the connector 50, the working pressure of the flange connection, the sizes and types of components used, and other variables that depend on the implementation. Once the designated pressure has been reached, the appropriate ring gasket seal from the gasket 35 is achieved between the flange component 10 and the casing head 30. In addition, after application of hydraulic pressure to the stud pistons 60 to the designated pressure, the threaded connections provided by the connectors 50 can be at the API-recommended tension. A flange pressure test can then be performed to ensure that the connections have been made properly and will hold rated working pressures.

The pressure can then be bled off from the input port 22, and the pump 100 can be disconnected. The tension of the connector 50 thereby extends along its length from one nut 92 to the other 94. Finally, the ports 22/24 can be plugged after successful installation and bleed off steps have been completed.

Above the flange component 10, the other component 40 can install using conventional studs 42, nuts 44, and gasket 45. For example, the gasket 45 can position between the flanges 16/46, the studs 42 can fit through the stud holes 18/48, and the nuts 44 can be tightened on the studs 42. In another alternative, additional connectors 50 according to the present disclosure can be used for this flange connection provided one of the flanges 16/46 defines appropriate connector holes 20.

Figure 6:
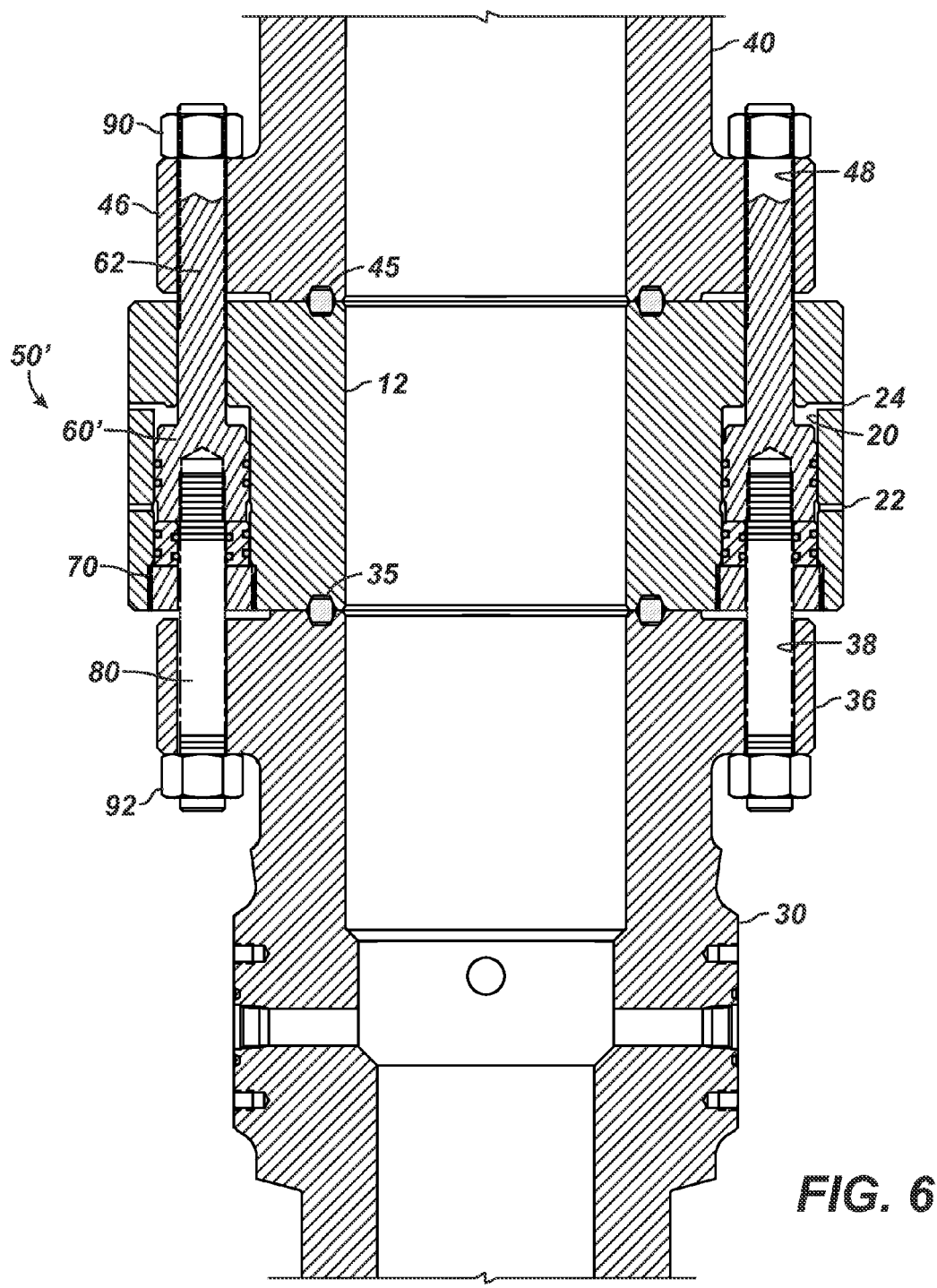
FIG. 6 illustrates a cross-section of an alternate BOP flange coupled to a casing head and another BOP component using with another arrangement of hydraulic flange connector according to the present disclosure.

Another hydraulic flange connector 50' and flange component 10' are shown in FIG. 6. Here, the flange component 10' lacks an upper flange that couples to another component 40 using conventional studs 42 and nuts 44 as in FIG. 5. Instead, the flange component 10' fits directly between the casing head 30 and the other component 40.

To do this, the stud pistons 60' have elongated stud portions 62 that pass all the way through to the upper component 40's stud holes 48 in its flange 46. Installation of these connectors 50' and flange component 10' is similar to that described previously. Yet, in this arrangement, the ring gasket seals for two gaskets 35/45 above and below the flange component 10' can be achieved by hydraulically tensioning the stud pistons 60' and manually tightening the nuts 90/92.

In previous arrangements, the connector holes 20 defined in the flange component 10 have one large threaded open end 29 and one narrow open end 26, and the retainer 70 seals in the large threaded open end 29. In one alternative shown in FIG. 7, the connector hole 20 can have upper and lower open ends with internal threads 29/29'. A first retainer 70 can seal the stud piston 60 in the bore 20 as before so that the stud 80 extends therefrom. A second retainer 70B with a similar configuration threads into the upper thread 29' to seal off the top of the connector hole 20. The stud portion 62 of the stud piston 60 can then extend from this second retainer 70B.

In previous arrangements, the retainer 70 such as shown in FIG. 3 and elsewhere has two elements. An alternative shown in FIG. 7B, a seal retainer 70' has a unitary body 75 having external O-ring seals 76, internal O-ring seals 77, and the external thread 79. This retainer 70' can fit onto the stud 80 as before to seal the connector hole 20, and the retainer's thread 79 can thread into the bore's thread 29.

In previous arrangements, the various stud pistons 60/60' have been disclosed as a unitary piece having a piston portion and a stud portion integrally connected together. In an alternative shown in FIG. 8A, a stud piston 60A can have a piston portion 62 as one element. Upper and lower studs 80/80' connect to threaded openings in this piston portion 62 by threading or the like to complete the stud piston 60A and double-end stud 80 of the connector 50.

Similarly, the stud piston 60/60' and the stud 80 have been described as separate elements. In an alternative shown in FIG. 8B, a stud piston 60B can be a unitary component. Here, the stud piston 60B has a piston portion 62 and two opposing stud portions 64/64' integrally connected thereto.

Finally, the flange component 10 has been disclosed as connecting to the flange 36 of a casing head 30 using the hydraulic connectors 50. It will be appreciated that the teachings of the present disclosure can be applied to flange connections for other components. For example, although shown for use with BOP components, tubing spools, casing heads and the like for a wellhead, the teaching of the present disclosure can be used with any type of flanged components. In addition, hydraulic pressure applied to the port 22 moves the stud piston 60 in one direction toward the stud passage 26 of the connector hole 20. The reverse is also possible in which hydraulic pressure applied to the port 24 can move the stud piston 60 in the opposite direction if desired.

Additionally, several hydraulic connectors 50 have been shown to connect flanges together, and preferably each of the stud holes in the flange 10 defines a connector hole 20 for such a connector 50. It will be appreciated, however, that depending on the implementation only one or more than one but less than all of the stud holes in the flange component 10 may actually define connector holes 20 for the hydraulic connectors 50. For example, some of the stud holes may use conventional studs and nuts, while others may have the connector holes 20 for the hydraulic connectors 50.

These and other alternatives will be appreciated by those skilled in the art having the benefit of the present disclosure. Accordingly, the foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of making a hydraulic flange connection, the method comprising:
   disposing a connector in a connector hole of a first flange component;
   disposing the first flange component adjacent a second flange component;
   threading first and second fasteners respectively on first and second stud ends of the connector against the first and second flange components;
   tensioning at least a portion of the connector by applying hydraulic pressure against the connector in the connector hole through at least one port in the first flange component; and
   tightening at least one of the first and second fasteners on a corresponding one of the first and second stud ends.

2. The method of claim 1, wherein disposing the connector in the connector hole of the first flange component comprises extending the first stud end through a first open end of the connector hole on a first side of the first flange component and extending the second stud end through a second open end of the connector hole on a second side of the first flange component.

3. The method of claim 1, wherein disposing the first flange component adjacent the second flange component comprises disposing a gasket between the first and second flange components.

4. The method of claim 1, wherein disposing the first flange component adjacent the second flange component comprises inserting the second stud end of the connector through a stud hole in the second flange component.

5. The method of claim 1, wherein tensioning at least the portion of the connector comprises moving a piston of the connector in the connector hole with the hydraulic pressure applied through the at least one port in the first flange component.

6. The method of claim 1, wherein applying the hydraulic pressure through the at least one port in the first flange component comprises coupling a pump to the at least one port.

7. The method of claim 1, wherein disposing the connector in the connector hole of the first flange component comprises biasing the connector with a spring disposed in the connector hole.

8. The method of claim 1, wherein disposing the connector in the connector hole of the first flange component comprises disposing a piston of the connector in the connector hole, the piston having at least one of the first and second stud ends integrally formed to the piston.

9. The method of claim 1, wherein disposing the connector in the connector hole of the first flange component comprises disposing a piston of the connector in the connector hole, the piston having at least one of the first and second stud ends threaded into a threaded end of the piston.

10. The method of claim 1, wherein disposing the connector in the connector hole of the first flange component comprises retaining the connector in the connector hole with a retainer disposed in an open end of the connector hole, the retainer having one of the first and second stud ends passing therethrough.

11. The method of claim 10, wherein retaining the connector in the connector hole with the retainer disposed in the open end of the connector hole comprises externally sealing the retainer inside the connector hole and internally sealing the retainer against the one of the first and second stud ends.

12. The method of claim 1, wherein disposing the connector in the connector hole of the first flange component comprises sealing a piston of the connector in the connector hole, the piston having the first and second stud ends extending therefrom in opposite directions.

13. The method of claim 1, wherein the first flange component defines a plurality of the connector holes, and wherein the method comprises disposing a plurality of the connectors in the connector holes.

14. A method of making a hydraulic flange connection, the method comprising:
   disposing a connector in a connector hole of a first flange component;
   disposing the first flange component adjacent a second flange component;
   affixing first and second stud ends of the connector respectively relative to the first and second flange components;
   tensioning at least a portion of the connector by applying hydraulic pressure against the connector in the connector hole through at least one port in the first flange component; and
   tightening the affixing between the first and second stud ends.

15. The method of claim 14, wherein affixing the first and second stud ends of the connector respectively relative to the first and second flange components comprises threading a first fastener on the first stud end against the first flange component.

16. The method of claim 14, wherein affixing the first and second stud ends of the connector respectively relative to the first and second flange components comprises:
disposing a third flange component adjacent the first flange component; and
affixing the first stud end relative to the third flange component.

17. The method of claim 16, wherein affixing the first stud end relative to the third flange component comprises threading a first fastener on the first stud end against the third flange component.

18. The method of claim 14, wherein affixing the first and second stud ends of the connector respectively relative to the first and second flange components comprises threading a second fastener on the second stud end against the second flange component.

19. The method of claim 14, wherein the first flange component comprises a wellhead component; and wherein the second flange component comprises a casing head having the wellhead component installed thereon.

20. The method of claim 14, further comprising connecting a third flange component to the first flanged component.

21. The method of claim 20, wherein connecting the third flange component to the first flanged component comprises using a double-ended stud and fasteners to connect the third flange component to the first flange component.

22. A method of making a hydraulic flange connection to a first wellhead component having first stud holes, the method comprising:
providing a first flange component having connector holes disposed thereabout;
disposing connectors in the connector holes of the first flange component;
disposing the first flange component adjacent the wellhead component;
affixing first and second stud ends of the connectors respectively relative to the first flange component and the wellhead component;
tensioning at least portions of the connectors by applying hydraulic pressure against pistons of the connectors in the connector holes through at least one port in the first flange component; and
tightening the affixing between the first and second stud ends.

23. The method of claim 22, wherein disposing the connectors in the connector holes of the first flange component comprises extending the first stud ends through first open ends of the connector holes on a first side of the first flange component and extending the second stud ends through second open ends of the connector holes on a second side of the first flange component.

24. The method of claim 22, wherein disposing the first flange component adjacent the wellhead component comprises inserting the second stud ends of the connectors through stud holes in the wellhead component.

25. The method of claim 22, wherein tensioning at least the portions of the connectors comprises moving the pistons of the connectors in the connector holes with the hydraulic pressure applied through the at least one port in the first flange component.

26. The method of claim 22, wherein applying the hydraulic pressure through the at least one port in the first flange component comprises coupling a pump to the at least one port.

27. The method of claim 22, wherein affixing the first and second stud ends of the connector respectively relative to the first flange component and the wellhead component comprises threading a first fastener on the first stud end against the first flange component or against a second flange component disposed adjacent the first flange component.

28. The method of claim 22 wherein affixing the first and second stud ends of the connector respectively relative to the first flange component and the wellhead component comprises threading a second fastener on the second stud end against the wellhead component.

* * * * *